(12) United States Patent
Sun et al.

(10) Patent No.: US 8,724,453 B2
(45) Date of Patent: May 13, 2014

(54) METHOD AND APPARATUS FOR IMPLEMENTING TRUNK OPTICAL FIBER PROTECTION IN ETHERNET PASSIVE OPTICAL NETWORK (EPON)

(75) Inventors: Weiping Sun, Shenzhen (CN); Jianxin Lu, Shenzhen (CN); Yunpeng Xie, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 352 days.

(21) Appl. No.: 13/258,277

(22) PCT Filed: Nov. 9, 2009

(86) PCT No.: PCT/CN2009/074859
§ 371 (c)(1),
(2), (4) Date: Nov. 1, 2011

(87) PCT Pub. No.: WO2010/130123
PCT Pub. Date: Nov. 18, 2010

(65) Prior Publication Data
US 2012/0045199 A1 Feb. 23, 2012

(30) Foreign Application Priority Data
May 14, 2009 (CN) .......................... 2009 1 0084456

(51) Int. Cl.
*G01R 31/08* (2006.01)
(52) U.S. Cl.
USPC ........................................... 370/220; 398/17
(58) Field of Classification Search
CPC .............................................. H04Q 2011/0081
See application file for complete search history.

(56) References Cited

U.S. PATENT DOCUMENTS

| 8,380,065 B2 * | 2/2013 | Okuno et al. | 398/66 |
| 2005/0201554 A1 * | 9/2005 | Kramer et al. | 380/28 |

(Continued)

FOREIGN PATENT DOCUMENTS

| CN | 1512684 A | 7/2004 |
| CN | 1866804 A | 11/2006 |

(Continued)

OTHER PUBLICATIONS

International Search Report in international application No. PCT/CN2009/074859, mailed on Mar. 4, 2010.

(Continued)

*Primary Examiner* — Phirin Sam
(74) *Attorney, Agent, or Firm* — Oppedahl Patent Law Firm LLC

(57) ABSTRACT

The present invention provides a method and apparatus for implementing trunk optical fiber protection in EPON. According to the technical scheme of the present invention, activating an optical module at a master PON port, deactivating an optical module at a standby PON port, configuring a service for the master PON port, and synchronizing static data and dynamic data to the standby PON port; synchronizing and adjusting a value of an MPCP counter at the standby PON port according to a value of an MPCP counter at the master PON port; and carrying out fault detection, transmitting an operating state to the standby PON port when the fault occurs, and performing a master-standby switch of the PON ports. In accordance to the present invention, by means of adjusting the MPCP counter at the standby PON port and further setting a dedicated communication channel, the fast communication between the master and standby PON ports is realized, so that the ONU does not to re-register when performing the master-standby switch for implementing the trunk optical fiber protection process in EPON system, as a consequence, the service restoration time for protection switch is remarkably shortened, the system reliability is enhanced, and the performance of the protection switch is improved.

12 Claims, 3 Drawing Sheets

(56) References Cited

U.S. PATENT DOCUMENTS

| | | | |
|---|---|---|---|
| 2008/0267628 A1 | 10/2008 | Li et al. | |
| 2009/0196606 A1* | 8/2009 | Miyagi et al. | 398/45 |
| 2009/0262937 A1* | 10/2009 | Hirth et al. | 380/256 |
| 2010/0098407 A1* | 4/2010 | Goswami et al. | 398/5 |
| 2010/0098433 A1* | 4/2010 | Boyd et al. | 398/155 |
| 2010/0166419 A1* | 7/2010 | Elmoalem et al. | 398/2 |
| 2012/0301147 A1* | 11/2012 | Zhao et al. | 398/66 |

FOREIGN PATENT DOCUMENTS

| | | |
|---|---|---|
| CN | 1901419 A | 1/2007 |
| CN | 1921357 A | 2/2007 |
| CN | 1925371 A | 3/2007 |
| CN | 101167274 | 4/2008 |
| CN | 101237254 A | 8/2008 |
| CN | 101267259 A | 9/2008 |
| CN | 101350679 A | 1/2009 |
| CN | 101414878 A | 4/2009 |
| JP | 2009055494 A | 3/2009 |
| KR | 20040057853 A | 7/2004 |
| KR | 100833504 B1 | 5/2008 |
| WO | 2008126162 A1 | 10/2008 |
| WO | 2008146344 A1 | 12/2008 |

OTHER PUBLICATIONS

English Translation of the Written Opinion of the International Search Authority in international application No. PCT/CN2009/074859, mailed on Mar. 4, 2010.

* cited by examiner

METHOD AND APPARATUS FOR IMPLEMENTING TRUNK OPTICAL FIBER PROTECTION IN ETHERNET PASSIVE OPTICAL NETWORK (EPON)

TECHNICAL FIELD

The present invention relates to a Passive Optical Network (PON) technology, specifically relates to a method and apparatus for implementing trunk optical fiber protection in Ethernet Passive Optical Network (EPON) system.

BACKGROUND

EPON is a new type of optical fiber access network technology, which employs passive optical transmission with a point-to-multipoint structure to provide a variety of services on the Ethernet. The EPON is comprised of an Optical Line Terminal (OLT) at the local side, an Optical Network Unit (ONU) at the user side and an Optical Distribution Network (ODN). The EPON uses the PON technology on physical layer and the Ethernet protocol on link layer, and utilizes the topology structure of the PON to realize the access to the Ethernet. Therefore, the EPON integrates the following advantages of the PON and the Ethernet: low cost, high bandwidth, strong expansibility, flexibly and fast service recombination, compatibility with the current Ethernet and convenient management etc.

Optical signals are transmitted between the OLT and the ONU, and there are no active devices on the signal channels, the internal elements include: optical fibers, a passive combiner, and a passive optical coupler/passive optical splitter. The downlink direction is from the OLT to the ONU, i.e. point-to-multipoint, for which the broadcast mechanism is employed. The optical signals sent by the OLT is split onto multiple optical fibers by the passive optical splitter and transmitted to each ONU. The ONU extracts the useful optical signals according to the address of the Media Access Control (MAC) layer. The uplink direction is from the ONU to the OLT, i.e. multipoint-to-point, for which the time division multiplexing mechanism is employed. Optical signals from each ONU are combined onto one optical fiber by the passive optical coupler and transmitted to the OLT. The OLT distributes a time slot for each ONU to avoid collision of data sent by different ONUs. The ONU first caches the data packet, and then sends the cached data packet at the arrival of the time slot belonging to itself.

Each ONU in the EPON utilizes the time division method to access the system. Therefore, only if the OLT and the ONU should be synchronous before the beginning of communication, the correct transmission of information can be ensured. The system synchronization of the EPON is realized by synchronizing a Multi-Point Control Protocol (MPCP) counter which is a local clock counter used for counting time granules. Every frames transmitted by the OLT on the downlink include the value of the MPCP counter. The ONU overlaps the value of the local MPCP counter according to the received value of the MPCP counter. The system synchronization of the EPON requires an information bit sent by the OLT at the OLT local time T. The ONU must receive the information bit at the ONU local time T. Since the distances from each ONU to the OLT in the EPON are different, the transmission delays are different as well. In order to achieve the system synchronization, the ONU clock must have a time delay from the OLT clock, wherein the time delay is a Downlink Delay (DD), that is, if the OLT sends an information bit at timing 0 of the OLT clock, the ONU must receive the information bit at timing 0 of the ONU clock. The Round-Trip Time (RTT) is the sum of the DD and an Uplink Delay (UD). The RTT must be known and transmitted to the ONU by the OLT. The process of obtaining the RTT is called ranging. The data sent by different ONUs on the downlink of the same OLT will not collide only when the system synchronization of the EPON is realized.

The typical topology structure of the EPON system is in a tree form, as shown in FIG. 1. A fault occurs at the trunk optical fiber between the OLT and the optical splitter will result in communication faults of all ONUs on the downlink of the OLT simultaneously. Therefore, for the important areas and important sites, protection of the trunk optical fiber to improve the reliability of the whole PON system is of great importance. A block diagram for implementing trunk optical fiber protection currently utilized by the EPON is shown in FIG. 2. Protecting the trunk optical fiber primarily comprises: setting a redundant trunk optical fiber, i.e. a standby trunk optical fiber, of a different path. Switch between the master trunk optical fiber and the standby trunk optical fiber is performed when a fault occurs at the master trunk optical fiber. Since the path lengths of the master trunk optical fiber and the standby trunk optical fiber are usually different, the UD, DD and RTT will change after the switch. The ONU updates the local MPCP counter in real time according to the received time stamp identifier which is from the OLT. Since the path lengths of the master trunk optical fiber and the standby trunk optical fiber are different, the MPCP counter of the ONU usually has a change of more than 8 Time Quantas (TQs). However, if the change of the MPCP counter of the ONU is more than 8 TQs, it will result in the ONU disconnection and requiring of a re-registration. Thus, the service restoration time cannot meet the carrier-grade requirement of 50 ms. Specifically, the TQ is a time unit of PON, with 1 TQ being equal to 16 ns.

It can be seen from the aforementioned description that, how to avoid re-registration of the ONU during protection switch of the EPON so as to shorten the service restoration time has become a problem to be solved.

SUMMARY

In view of this, the main purpose of the present invention is to provide a method and apparatus for implementing trunk optical fiber protection in Ethernet Passive Optical Network (EPON) to avoid re-registration of the Optical Network Unit (ONU) during protection switch of the EPON so as to shorten the service restoration time.

In order to achieve the aforementioned purpose, the technical scheme of the present invention is realized by the followings:

A method for implementing trunk optical fiber protection in EPON comprises:

activating an optical module at a master Passive Optical Network (PON) port, deactivating an optical module at a standby PON port, configuring a service for the master PON port, and synchronizing static data and dynamic data to the standby PON port;

synchronizing and adjusting a value of a Multi-Point Control Protocol (MPCP) counter at the standby PON port according to a value of an MPCP counter at the master PON port; and carrying out fault detection, if a fault occurs, transmitting an operating state to the standby PON port and performing a master-standby switch of the PON ports.

Preferably, the step of synchronizing and adjusting the value of the MPCP counter at the standby PON port may specifically comprise:

A: adjusting the value of its own MPCP counter by the standby PON port itself to be synchronous with the value of the MPCP counter at the master PON port according to the values of the MPCP counters at the master and standby PON ports when receiving a synchronous signal; and B: determining a path difference between the standby PON port and the master PON port according to a value of an MPCP counter at an Optical Network Unit (ONU) when the ONU sends an MPCP frame and the values of the MPCP counters at the master and standby PON ports when the MPCP frame arrives at the master and standby PON ports respectively; and adjusting the value of the MPCP counter at the standby PON port to be slower by the path difference than the value of the MPCP counter at the master PON port.

The Step A may specifically comprise:

latching the values of their own MPCP counters by the master PON port and the standby PON port themselves respectively when receiving the synchronous signal;

calculating a difference value between the latched value of the MPCP counter at the master PON port and the latched value of the MPCP counter at the standby PON port; and adjusting the value of its own MPCP counter by the standby PON port itself through adding the difference value.

After the Step B, the method may further comprise:

sending the MPCP frame from the master PON port to the ONU, and synchronizing the value of its own MPCP counter by the ONU itself with the master PON port according to the received MPCP frame; and sending the MPCP frame from the ONU, and determining an Round-Trip Time (RTT) from the standby PON port to the ONU according to the value of the MPCP counter at the ONU when the ONU sends the MPCP frame and the value of the MPCP counter at the standby PON port when the standby PON port receives the MPCP frame.

The step of carrying out the fault detection may specifically comprise:

determining whether there is abnormality at the master PON port by a core control panel through detecting a software state of an EPON line card where the master PON port is located, or an in-place situation of the EPON line card, or combination of the both; or, determining whether there is abnormality at a master trunk optical fiber by the master PON port through detecting an Signal Detection (SD) signal of the optical module using a hardware.

If the abnormality is detected, before performing the master-standby switch of the PON ports, the method may further comprise: determining whether a duration of the abnormality is longer than a predetermined time length; if it is, performing the master-standby switch of the PON ports, otherwise, continuing to perform the fault detection.

The step of performing the master-standby switch of the PON ports may comprise:

releasing its own master state, converting it into a standby state, and deactivating its own optical module by the master PON port itself; and converting its own state into the master state, activating its own optical module and taking over a service processing of the original master PON port by the standby PON port itself according to the synchronized static data and dynamic data.

An apparatus for implementing trunk optical fiber protection in Ethernet Passive Optical Network (EPON) comprises:

a core control panel, for setting a master PON port and a standby PON port at an Optical Line Terminal (OLT) side, completing data synchronization for the standby PON port and the master PON port, and transmitting an operating state from the PON port to an opposite PON port;

the master PON port, for activating its own optical module when in a master state and completing a service processing; and the standby PON port, for deactivating its own optical module when in a standby state, synchronizing and adjusting a value of a Multi-Point Control Protocol (MPCP) counter at the standby PON port according to a value of an MPCP counter at the master PON port, and performing a master-standby switch of the PON ports when a fault occurs.

Preferably, the master and standby PON ports may comprise a Complex Programmable Logic Devices (CPLD), a PON Media Access Control (MAC) and an optical module, the master PON port may be connected with a master trunk optical fiber via the optical module, the standby PON port may be connected with a standby trunk optical fiber via the optical module, and a dedicated communication channel is provided between the core control panel and the operating or standby PON port;

the CPLD may be responsible for communication via the dedicated communication channel between the current PON port and the opposite PON port; and is further used, if located at the master PON port, for activating the optical module; and is further used, if located at the standby PON port, for deactivating the optical module, synchronizing and adjusting the value of the MPCP counter at the standby PON port according to the value of the MPCP counter at the master PON port; and the PON MAC may be responsible for EPON protocol processing and latching the values of the MPCP counters.

The dedicated communication channel may be connected with a Time Division Multiplexing (TDM) mode cross chip or a Field-Programmable Gate Array (FPGA) chip at a core control panel side.

In accordance to the method and apparatus for implementing trunk optical fiber protection in EPON, by means of adjusting the MPCP counter at the standby PON port and further setting a dedicated communication channel, the fast communication between the master and standby PON ports is realized, so that the ONU does not re-register when performing the master-standby switch for implementing the trunk optical fiber protection process in EPON system, as a consequence, the service restoration time for protection switch is remarkably shortened, the system reliability is enhanced, and the performance of the protection switch is improved. The present invention can realize switch between any PON ports within the system, and can also implement protection in the case of abnormality caused by the plugging of the EPON line card or software abnormality.

DETAILED DESCRIPTION

The present invention is described in detail in combination with the drawings and specific embodiments hereinafter.

Figure 1:
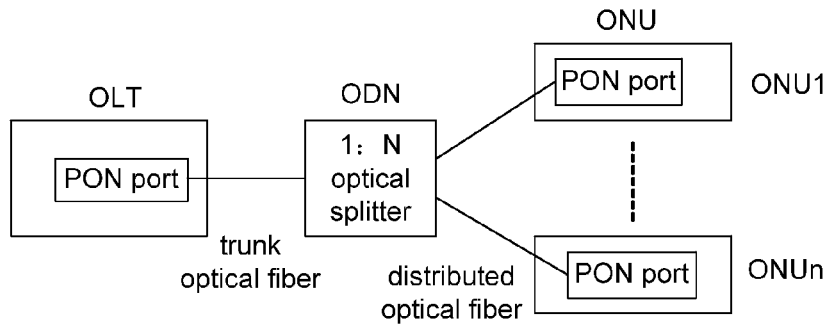
FIG. 1 is a schematic diagram of the topology structure in form of tree of an EPON system.
Figure 2:
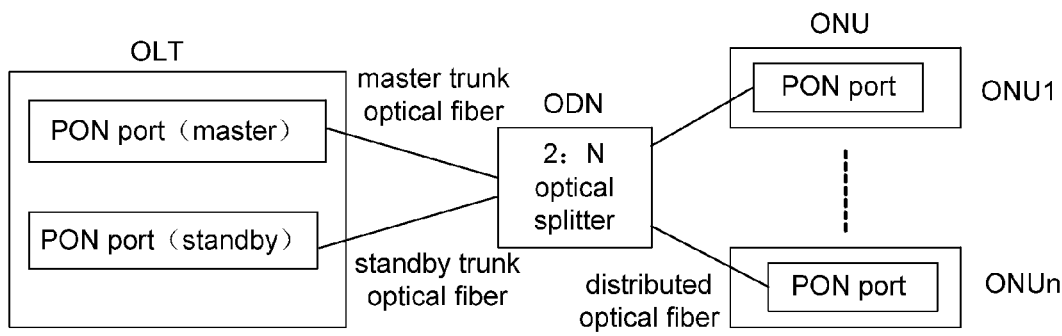
FIG. 2 is a structural schematic diagram of an EPON in which a trunk optical fiber protection is implemented in the prior art.
Figure 3:
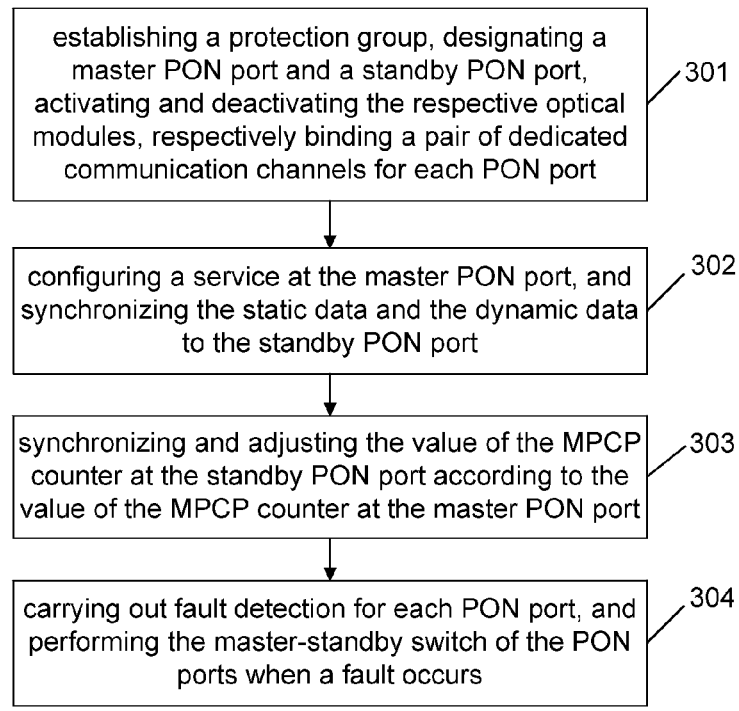
FIG. 3 is a flow schematic diagram of implementing the trunk optical fiber protection in EPON according to the present invention.

An EPON line card can be provided with one or more PON ports. The protection among the PON ports on the same EPON line card is called on-board protection and the protection among the PON ports on different EPON line cards is called inter-board protection. The specific embodiments described hereinafter take the establishment of an inter-board protection group as an example, to illustrate the process of implementing the trunk optical fiber protection according to the present invention. As shown in FIG. 3, the flow of implementing the trunk optical fiber protection in EPON according to the present invention comprises the following steps:

Step 301: establishing a protection group; specifically, designating a master PON port and a standby PON port by the core control panel at the OLT side, respectively binding a pair of dedicated communication channels for the master PON port and the standby PON port.

The core control panel selects a PON port from the two EPON line cards respectively to establish a protection group, e.g. takes the PON1 port as the master PON port, i.e. the operating PON port, and takes the PON2 port as the standby PON port, i.e. the protection PON port. The master PON port enables its own optical module, that is, activates its own optical module, and the standby PON port deactivates its own optical module so that only the optical module of the master PON port operates during downlink transmission. The core control panel further binds a pair of dedicated communication channels for the master PON port and the standby PON port respectively. When the protection group operates, the dedicated communication channels corresponding to the master and standby PON ports are simultaneously put through by the core control panel. The dedicated communication channels can be TDM channels.

The dedicated communication channels are used for the master PON port or the standby PON port to transmit their respective operating state to the opposite PON port via the core control panel. The operating state includes: master/standby state of the PON port, software/hardware state of the PON port and Loss of Signal (LOS) alarm. Specifically, the software state of the PON port refers to whether the software operations of the Complex Programmable Logic Devices (CPLD) and the EPON core service chip (for example, a PON Media Access Control (MAC) chip) on the EPON line card where the PON port is located is normal, etc. The signal of the LOS alarm, the operating state of the PON port and the Signal Detection (SD) signal are transmitted together via the dedicated communication channels to realize transmission of information redundancy. For the master PON port, the opposite PON port is the standby PON port, and for the standby PON port, the opposite PON port is the master PON port. For the opposite EPON line card, the situation is the same as the situation explained above.

Step 302: when the protection group begins to operate, configuring a service at the master PON port by the core control panel, and synchronizing the static data and the dynamic data to the standby PON port.

When the protection group is successfully established and begins to operate, the core control panel performs static data configuration at the master PON port and synchronizes the static data to the standby PON port. During the operation of the protection group, the dynamic data is periodically synchronized to the standby PON port. The data synchronization of the master PON port and the standby PON port can be realized by the dedicated communication channels or by other paths, e.g. by the existing connection between the EPON line card and the core control panel.

The static data includes: service data such as the information list of the ONU, the uplink and downlink bandwidths distributed by the OLT to each ONU, the port enabling situation of the ONU and the binding situation of the Virtual Local Area Network (VLAN), etc. The dynamic data is mainly the Logical Link IDs (LLID)-MAC layer address list.

Step 303: synchronizing and adjusting the value of the MPCP counter at the standby PON port according to the value of the MPCP counter at the master PON port.

When sending the MPCP frame, the OLT inserts the value of the MPCP counter of the OLT clock, namely the absolute clock, into the time label field of the MPCP frame. The ONU should refresh the value of the MPCP counter of the ONU clock according to the new time label value included in the MPCP frame whenever the MPCP frame sent by the OLT is received by the ONU. Similarly, when sending the MPCP frame, the ONU should also insert the value of the MPCP counter of the ONU into the time label field of the MPCP frame. The OLT will check the time label of the received MPCP frame and acquire the value of the MPCP counter of the ONU when the ONU sends the MPCP frame. The OLT calculates a difference value between the received time label value and the OLT clock to obtain an RTT of the ONU. Since the transmission paths from different PON ports of the OLT to the same ONU are different, the RTTs obtained on different PON ports to the same ONU are also different.

Figure 4:
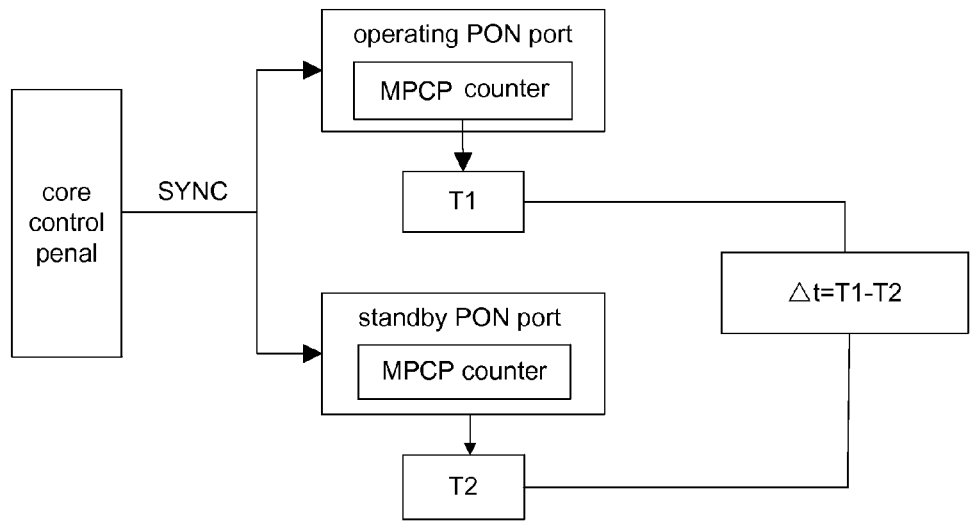
FIG. 4 is a schematic diagram of the principle for realizing the synchronization of MPCP counters according to the present invention.

The present invention utilizes the following method to realize synchronization and adjustment of the value of the MPCP counter at the standby PON port to ensure smooth transition of the MPCP counter of the ONU after the master-standby switch, specifically comprising:

a. processing the master and standby PON ports by synchronization method so that the value of the MPCP counter at the standby PON port accords with the value of the MPCP counter at the master PON port, wherein the synchronization principle is shown in FIG. 4, in which:

the core control panel sends a synchronous signal (SYNC), and the master and standby PON ports latch the values of respective MPCP counters when receiving the synchronous signal, wherein the values are T1 and T2 respectively. T1 or T2 can be transmitted to the opposite EPON line card via the dedicated communication channel. Then, the opposite EPON line card calculates a difference value of the values of the two MPCP counters as Δt=T1-T2. When the next synchronous signal arrives, the standby PON port adjusts the value of its MPCP counter by adding Δt, and after the synchronization, the value of the MPCP counter at the standby PON port accords with the value of the MPCP counter at the master PON port.

b. calculating a path difference "x" between the master and standby trunk optical fibers according to the value of the MPCP counter at the ONU when the ONU sends the MPCP frame and the value of each MPCP counter at the master and standby PON ports when the MPCP frame arrives at the master and standby PON ports respectively.

Figure 5:
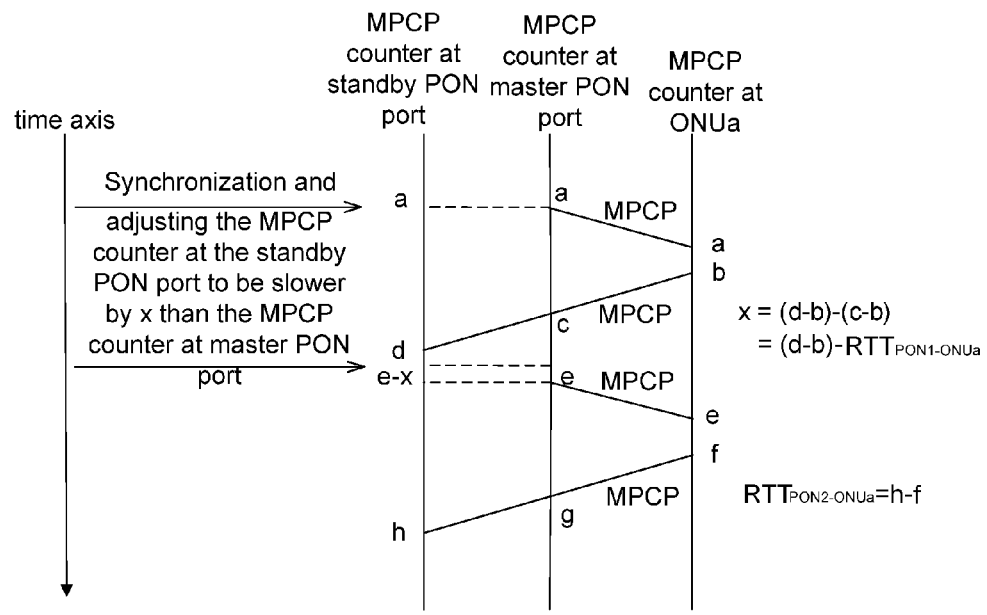
FIG. 5 is a schematic diagram of the principle for calculating a path difference "x" between the master and standby trunk optical fibers and an RTT from the standby PON port to the ONU port according to the present invention.

The calculation process of "x" is shown in FIG. 5, comprising the following steps:

in FIG. 5, the three vertical lines represent the MPCP counter at the standby PON port, the MPCP counter at the master PON port and the MPCP counter at an ONUa, respectively. The value of each MPCP counter increases along the direction of the time axis, wherein "a", "b", ..., "f" are values of the MPCP counters. The master PON port broadcasts the MPCP frame at timing "a" via the downlink channel. The MPCP frame passes DD and arrives at the ONUa, and the ONUa resets the MPCP counter to be "a". Then, at timing "b", that is, when the value of its own MPCP counter is "b", the ONUa sends the MPCP frame back to the OLT. At this time, the time stamp identifier in the MPCP frame is "b". At timing "c", that is, when its value of the MPCP counter is "c", the master PON port receives the MPCP frame. The value of its MPCP counter is "d" when the standby PON port receives the MPCP frame.

The difference between "d" and "c" reflects the difference between the receiving paths of the master and standby trunk optical fibers, that is, the one path difference "x" between the transmission paths of the master PON port and the standby PON port. "x" can be calculated by the following method:

$$x = d - c = (d - b) - (c - b) = (d - b) - \text{RTT}_{PoN1\text{-}ONUa}$$

The RTT of PON1-ONUa, i.e. the RTT from the master PON to the ONUa, can be acquired by the master PON port.

"x" is the difference between the receiving paths of the master PON port and the standby PON port, and also is the difference between the sending paths from the master PON port and the standby PON port to the ONU during the switch.

c. the standby PON port adjusts its own MPCP counter to be slower by x than the value of the MPCP counter at the master PON port, wherein "x" is a number with a symbol.

d. the core control panel calculates the RTT from the standby PON port to the ONUa, and the calculation process of the RTT is as follows:

At a certain moment, the value of the MPCP counter at the master PON port is "e" and the value of the MPCP counter at the standby PON port is "e-x". The time stamp identifier included in the MPCP frame sent by the master PON port is e, that is, if the MPCP frame is sent from the standby PON port, the time stamp identifier included in the MPCP frame is "e-x. After receiving the MPCP frame including the time stamp identifier "e", the ONUa synchronizes the value of the local MPCP counter to be "e". The ONUa sends the MPCP frame on uplink when the value of its MPCP counter is "f", and the time stamp identifier of the MPCP frame inserting is the value "f" of the MPCP counter at the ONUa at the moment. The value of the local MPCP counter is "g" when the MPCP frame is received by the master PON port, and the value of the local MPCP counter is "h" when the MPCP frame is received by the standby PON port.

Then, the RTT from the standby PON port to the ONUa is "h-f", that is, $$\text{RTT}_{PON2\text{-}ONUa} = h - f$$

After the aforementioned adjustment, synchronization of the value of the MPCP counter at the standby PON port and the value of the MPCP counter at the master PON port is realized. In this way, during the switch of the master-standby PON ports, for the ONU, the value of the MPCP counter thereof will not have a great change, thus the switch can be performed smoothly. In addition, since the RTT from the standby PON port to each ONU is obtained, it is unnecessary to perform ranging again.

Step 304: performing detection for the master trunk optical fiber or the master PON port, and performing master-standby switch of the PON ports when a fault occurs at the master trunk optical fiber or the master PON port.

Figure 6:
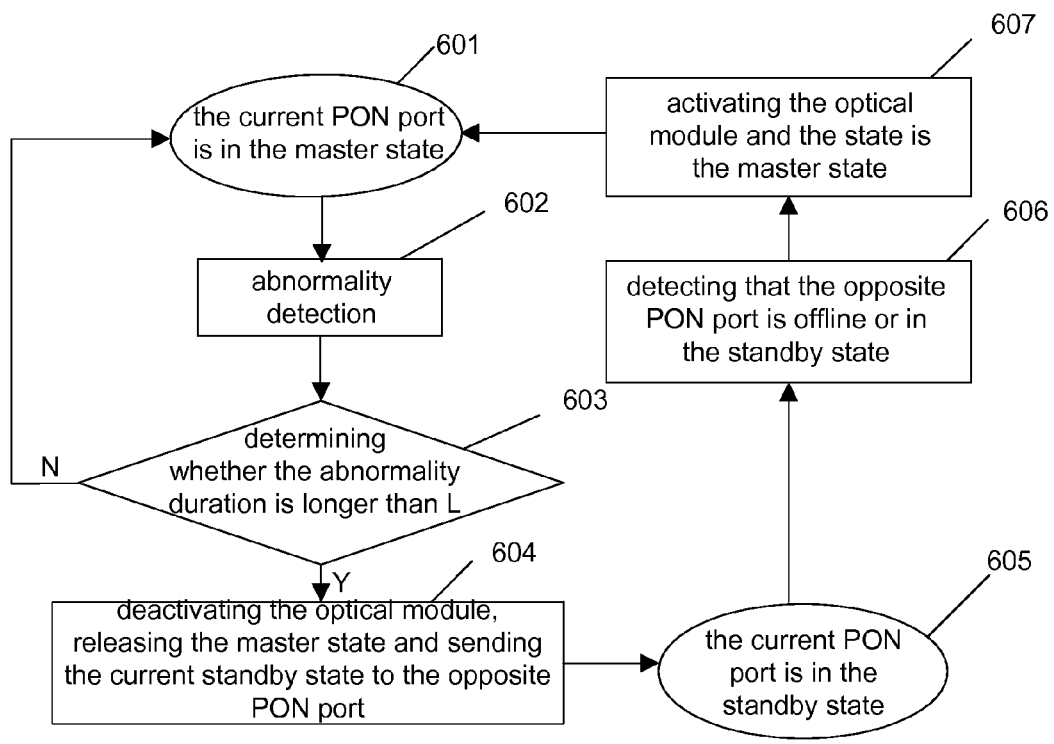
FIG. 6 is a flowchart of a master-standby switch of the trunk optical fibers according to the present invention.

In order to prevent the optical modules of the master and standby PON ports from emitting lights at the same time, the switch logic of the master and standby PON ports utilized is an interlocking logic, that is, only the optical module of the master PON port is activated currently. The flow of the master-standby switch of the PON ports is shown as FIG. 6, primarily comprising two parts: the master PON port is switched from the master state to the standby state, and the standby PON port is switched from the standby state to the master state, specifically comprising the following steps:

Step 601~Step 603: when abnormality of the master trunk optical fiber or the master PON port is detected, determining whether the abnormality duration is longer than L. If the abnormality duration is longer than L, performing Step 604, otherwise, returning to perform Step 601;

The core control panel detects the software state of the EPON line card where the master PON port is located or the in-place situation of the EPON line card, or the combination of the both to determine whether there is abnormality at the master PON port. The master PON port determines whether there is abnormality at the master trunk optical fiber by detecting the SD signal of the optical module using hardware.

L is a fixed value set to prevent frequent switch. It is required that the interval of each switch should be greater than L. The fixed value is determined according to specific requirement and set primarily according to the ONU discovery time and the ONU registration time.

Step 604~Step 607: switch of the master and standby PON ports is performed. The PON port in the standby state detects the master-standby state of the opposite PON port in real time via the dedicated communication channel. When it is detected that the master-standby state of the opposite PON port is the standby state or it is discovered that the state of the opposite PON port is offline, the opposite PON port is immediately switched to the master state.

If the core control panel determines that there is abnormality at the master PON port by detecting the software state of the EPON line card where the master PON port is located or the in-place situation of the EPON line card, or the combination of the both, the performance of the master-standby switch of the PON ports specifically comprises:

If the PON port can maintain the basic operation, and if the EPON line card is in place and there is an error in the software, the master PON port releases its master state, turns into the standby state, deactivates its optical module and notifies the standby PON port that the master-standby state of the master PON port is the standby state at the moment via the dedicated communication channel. The standby PON port receives the standby state provided by the master PON port, turns its own master-standby state into the master state, activates its optical module and takes over the service processing of the original master PON port according to the synchronized static data and dynamic data to realize the master-standby switch of the PON ports;

if the master PON port cannot maintain the basic operation, and if the EPON line card is not in place, the core control panel notifies the standby PON port that the opposite PON port is offline. The standby PON port turns its master-standby state into the master state, activates its optical module and takes over the service processing of the original master PON port according to the synchronized static data and dynamic data to realize the master-standby switch of the PON ports.

If the master PON port determines that there is abnormality at the master trunk optical fiber by detecting the SD signal of the optical module using hardware, the specific processing of performing the master-standby switch of the PON ports specifically comprises: the master PON port releases its master state, turns into the standby state, deactivates its optical module and notifies the standby PON port that the master-standby state is the standby state at the moment via the dedicated communication channel. The standby PON port receives the standby state provided by the master PON port, turns its own master-standby state into the master state, activates its optical module and takes over the service processing of the original master PON port according to the synchronized static data and dynamic data to realize the master-standby switch of the PON ports.

After the master-standby switch of the PON ports, if the fault of the original master PON port or the master trunk optical fiber is eliminated, the corresponding PON port can be switched to the master PON port by performing master-standby switch of the PON ports again.

Figure 7:
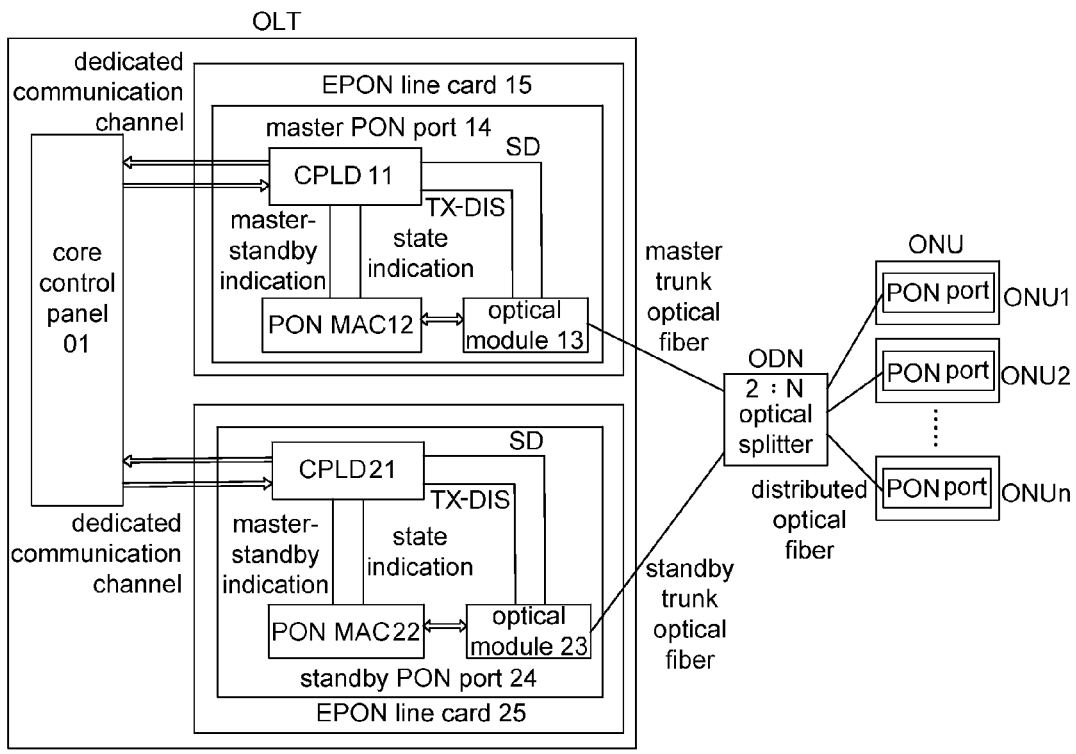
FIG. 7 is a structural schematic diagram of an apparatus for implementing the trunk optical fiber protection in EPON according to the present invention.

Based on the aforementioned method, the apparatus for implementing trunk optical fiber protection in EPON according to the present invention is shown as FIG. 7, comprising: a core control panel 01, a master PON port 14 and a standby PON port 24, wherein a dedicated communication channel is provided between the core control panel 01 and the master PON port 14 or the standby PON port 24. The master PON port 14 and the standby PON port 24 can be located on the same EPON line card or on different EPON line cards, for example, the EPON line card 15 includes the master PON port 14 and the EPON line card 25 includes the standby PON port 24.

Wherein, the core control panel 01 is used for setting a master PON port and a standby PON port at the OLT side, completing data synchronization for the standby PON port 24 and the master PON port 14 and transmitting the operating state from the PON port to the opposite PON port via the dedicated communication channel. The master PON port 14 is used for activating its optical module when in the master state and completing the service processing. The standby PON port 24 is used for deactivating its optical module when in the standby state, synchronizing and adjusting the value of the MPCP counter at the standby PON port according to the value of the MPCP counter at the master PON port, and when the master-standby state of the opposite PON port received via the dedicated communication channel is the standby state, turning its master-standby state into the master state and switching to the master PON port. The core control panel 01 is further used for determining the RTT from the standby PON port to the ONU.

Each PON port includes a CPLD, a PON MAC and an optical module. The master PON port is connected to the master trunk optical fiber via the optical module. The standby PON port is connected to the standby trunk optical fiber via the optical module. The trunk optical fiber is connected to the optical splitter.

When the protection group operates, static data is configured at the master PON port and synchronized to the standby PON port. The value of the MPCP counter at the standby PON port is synchronized and adjusted according to the value of the MPCP counter at the master PON port. During the normal operation, the OLT transmits optical signals via the master PON port and the master trunk optical fiber. The core control panel 01 periodically synchronizes the dynamic data to the standby PON port 24 to realize rapid master-standby switch when a fault occurs at the master PON port 14 or the master trunk optical fiber.

The CPLD is responsible for the communication via the dedicated communication channel between the current PON port and the opposite PON port, and is further used, if located at the master PON port, for activating the optical module and determining whether there is abnormality at the trunk optical fiber by detecting the SD signal of the optical module, and is further used, if located at the standby PON port, for deactivating the optical module, synchronizing and adjusting the value of the MPCP counter at the standby PON port according to the value of the MPCP counter at the master PON port.

The PON MAC is responsible for EPON-related protocol processing and latching the values of the MPCP counters at the PON MAC.

The dedicated communication channel is used for the communication between the PON port and the opposite PON port, and transmitting its own operating state of the PON port to the opposite PON port. The dedicated communication channel at the EPON line card side is connected to the CPLD. The dedicated communication channel at the core control panel 01 side can be connected to a Time Division Multiplexing (TDM) cross chip or a Field-Programmable Gate Array (FPGA) chip to realize data exchange.

The apparatus for implementing trunk optical fiber protection in EPON according to the present invention is described in details in combination with specific embodiments.

The core control panel 01 sets the PON1 port on the EPON line card 15 as the master PON port 14 and sets the PON2 port on the EPON line card 25 as the standby PON port 24. The CPLD 11 of the master PON port 14 activates the optical module 13 of the master PON port 14. The CPLD 21 of the standby PON port 24 deactivates the optical module 23 of the standby PON port 24. The core control panel 01 gets through the dedicated communication channels corresponding to the master PON port 14 and the standby PON port 24.

After the protection group is successfully established, the core control panel 01 configures service data on the master PON port 14 and synchronizes the static data to the standby PON port 24. During the operation of the protection group, dynamic data is periodically synchronized to the standby PON port 24.

Data synchronization is primarily completed by the core control panel 01. The core control panel 01 extracts the data from the master PON port 14 and then sends the data to the standby PON port 24.

The processing of synchronizing and adjusting the value of the MPCP counter at the standby PON port according to the value of the MPCP counter at the master PON port specifically comprises:

the core control panel 01 sends a synchronous signal (SYNC), after receiving the synchronous signal, the CPLDs of the master PON port 14 and the standby PON port 24 control the PON MAC to latch the respective MPCP counters to obtain T1 and T2 respectively. T1 or T2 can be transmitted to the opposite EPON line card via the dedicated communication channels. Then, the difference value of the values of the two MPCP counters is calculated by the opposite EPON line card as: $\Delta t = T1 - T2$. When the next synchronous signal arrives, the CPLD 21 adds the difference $\Delta t$ to the value of the MPCP counter at the standby PON port and latches the value in the PON MAC 22. The value of the MPCP counter at the standby PON port accords with the value of the MPCP counter at the master PON port after synchronization. The path difference "x" between the master and standby trunk optical fibers is calculated, wherein "x" is a number with a symbol. The CPLD 21 adjusts the MPCP counter of the standby PON port to be slower by x than the MPCP counter of the master PON port. The core control panel 01 calculates the RTT from the standby PON port 24 to each ONU.

Through the aforementioned adjustment, when performing switch of the master and standby PON ports, the MPCP counter at the ONU will not have a great change, thus the switch can be performed smoothly. In addition, since the RTT of the standby PON port is obtained, it is unnecessary to perform the ranging again.

Fault detection is performed for each PON port or the master trunk optical fiber, and master-standby switch of the PON ports is performed once a fault occur to the master trunk optical fiber or the master PON port.

Taking the master-standby switch of the PON ports when a fault occurs to the trunk optical fiber as an example, the master-standby switch process is described hereinafter, specifically comprising:

detecting the SD signal output from the optical module 13 by the master PON port 14 via the CPLD 11; when the SD signal outputs a low level, determining whether the low level duration is longer than L; if the duration is longer than L, deactivating the optical fiber 13 by the CPLD 11, sending an standby state indication to the PON MAC 12 that the PON port 14 is in the standby state, and transmitting a standby state signal to the core control panel by the CPLD 11 via the dedicated communication channel.

L is a fixed value set to prevent frequent switch. It is required that the interval of each switch must be greater than L. The fixed value is determined according to specific requirement, and primarily considering the ONU discovery time and the ONU registration time.

The core control panel 01 sends the received standby state signal of the master PON port 14 to the CPLD 21 via the dedicated communication channel. After receiving the standby state signal of the master PON port 14, the CPLD 21 activates the optical module 23 of the standby PON port 24, sends a master indication to the PON MAC 22 that the PON port 24 is in the master state.

Of course, this apparatus can detect the software state of the EPON line card where the master PON port 14 is located or the in-place situation of the EPON line card, or the combination of the both by the core control panel 01, to determine whether there is abnormality at the master PON port 14, and realize master-standby switch of the PON ports when the abnormality occurs.

The description above is only preferred embodiments of the present invention and does not aim to limit the protective scope of the present invention. Any modifications, equivalent replacements, improvements and the like made within the spirit and principle of the present invention should be included in the protective scope of the present invention.

The invention claimed is:

1. A method for implementing trunk optical fiber protection in Ethernet Passive Optical Network (EPON), comprising:
    activating an optical module at a master Passive Optical Network (PON) port, deactivating an optical module at a standby PON port, configuring a service for the master PON port, and synchronizing static data and dynamic data to the standby PON port;
    synchronizing and adjusting a value of a Multi-Point Control Protocol (MPCP) counter at the standby PON port according to a value of an MPCP counter at the master PON port, comprising:
        A: adjusting the value of its own MPCP counter by the standby PON port itself to be synchronous with the value of the MPCP counter at the master PON port according to the values of the MPCP counters at the master and standby PON ports when receiving a synchronous signal,
        B: determining a path difference between the standby PON port and the master PON port according to a value of an MPCP counter at an Optical Network Unit (ONU) when the ONU sends the MPCP frame and the values of the MPCP counters at the master and standby PON ports when the MPCP frame arrives at the master and standby PON ports respectively; and adjusting the value of the MPCP counter at the standby PON port to be slower by the path difference than the value of the MPCP counter at the master PON port; and
    carrying out fault detection, if a fault occurs, transmitting an operating state to the standby PON port and performing a master-standby switch of the PON ports.

2. The method according to claim 1, wherein the Step A specifically comprises:
    latching the values of their own MPCP counters by the master PON port and the standby PON port themselves respectively when receiving the synchronous signal;
    calculating a difference value between the latched value of the MPCP counter at the master PON port and the latched value of the MPCP counter at the standby PON port; and
    adjusting the value of its own MPCP counter by the standby PON port itself through adding the difference value.

3. The method according to claim 2, wherein after the Step B, the method further comprises:
    sending the MPCP frame from the master PON port to the ONU, and synchronizing the value of its own MPCP counter by the ONU itself with the master PON port according to the received MPCP frame; and
    sending the MPCP frame from the ONU, and determining an Round-Trip Time (RTT) from the standby PON port to the ONU according to the value of the MPCP counter at the ONU when the ONU sends the MPCP frame and the value of the MPCP counter at the standby PON port when the standby PON port receives the MPCP frame.

4. The method according to claim 2, wherein the step of carrying out the fault detection specifically comprises:
    determining whether there is abnormality at the master PON port by a core control panel through detecting a software state of an EPON line card where the master PON port is located, or an in-place situation of the EPON line card, or combination of the both; or,
    determining whether there is abnormality at a master trunk optical fiber by the master PON port through detecting an Signal Detection (SD) signal of the optical module using a hardware.

5. The method according to claim 4, wherein if the abnormality is detected, before performing the master-standby switch of the PON ports, the method further comprises:
    determining whether a duration of the abnormality is longer than a predetermined time length; if it is, performing the master-standby switch of the PON ports, otherwise, continuing to perform the fault detection.

6. The method according to claim 2, wherein the step of performing the master-standby switch of the PON ports comprises:
    releasing its own master state, converting it into a standby state, and deactivating its own optical module by the master PON port itself; and
    converting its own state into the master state, activating its own optical module and taking over a service processing of the original master PON port by the standby PON port itself according to the synchronized static data and dynamic data.

7. The method according to claim 1, wherein after the Step B, the method further comprises:
    sending the MPCP frame from the master PON port to the ONU, and synchronizing the value of its own MPCP counter by the ONU itself with the master PON port according to the received MPCP frame; and sending the MPCP frame from the ONU, and determining an Round-Trip Time (RTT) from the standby PON port to the ONU according to the value of the MPCP counter at the ONU when the ONU sends the MPCP frame and the value of the MPCP counter at the standby PON port when the standby PON port receives the MPCP frame.

8. The method according to claim 1, wherein the step of carrying out the fault detection specifically comprises:
determining whether there is abnormality at the master PON port by a core control panel through detecting a software state of an EPON line card where the master PON port is located, or an in-place situation of the EPON line card, or combination of the both; or,
determining whether there is abnormality at a master trunk optical fiber by the master PON port through detecting an Signal Detection (SD) signal of the optical module using a hardware.

9. The method according to claim 8, wherein if the abnormality is detected, before performing the master-standby switch of the PON ports, the method further comprises:
determining whether a duration of the abnormality is longer than a predetermined time length; if it is, performing the master-standby switch of the PON ports, otherwise, continuing to perform the fault detection.

10. The method according to claim 1, wherein the step of performing the master-standby switch of the PON ports comprises:
releasing its own master state, converting it into a standby state, and deactivating its own optical module by the master PON port itself; and
converting its own state into the master state, activating its own optical module and taking over a service processing of the original master PON port by the standby PON port itself according to the synchronized static data and dynamic data.

11. An apparatus for implementing trunk optical fiber protection in Ethernet Passive Optical Network (EPON), comprising:
a core control panel, for setting a master PON port and a standby PON port at an Optical Line Terminal (OLT) side, completing data synchronization for the standby PON port and the master PON port, and transmitting an operating state from the PON port to an opposite PON port;
the master PON port, for activating its own optical module when in a master state and completing a service processing; and
the standby PON port, for deactivating its own optical module when in a standby state, synchronizing and adjusting a value of a Multi-Point Control Protocol (MPCP) counter at the standby PON port according to a value of an MPCP counter at the master PON port, and performing a master-standby switch of the PON ports when a fault occurs,
wherein each of the master PON port and standby PON port comprise a Complex Programmable Logic Devices (CPLD), a PON Media Access Control (MAC) and a optical module,
wherein the master PON port is connected with a master trunk optical fiber via the optical module, the standby PON port is connected with a standby trunk optical fiber via the optical module, and a dedicated communication channel is provided between the core control panel and the operating or standby PON port, and
wherein the CPLD is responsible for the communication via the dedicated communication channel between the current PON port and the opposite PON port, and
wherein the CPLD is further configured, if located at the master PON port, to activate the optical module; and is further configured, if located at the standby PON port, to deactivate the optical module, synchronize and adjust the value of the MPCP counter at the standby PON port according to the value of the MPCP counter at the master PON port, and
wherein the PON MAC is responsible for EPON protocol processing and latching the values of the MPCP counters.

12. The apparatus according to claim 11, wherein the dedicated communication channel is connected with a Time Division Multiplexing (TDM) mode cross chip or a Field-Programmable Gate Array (FPGA) chip at a core control panel side.

* * * * *